Figure 1:
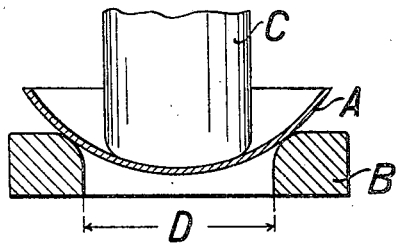

Oct. 16, 1928.

K. BÖHLE 1,688,111

MANUFACTURING KETTLE SHAPED HOLLOW BODIES

Filed Dec. 4, 1925

Inventor
Karl Böhle
By Knight Bros.
Attys.

Patented Oct. 16, 1928.

1,688,111

UNITED STATES PATENT OFFICE.

KARL BÖHLE, OF ESSEN, GERMANY, ASSIGNOR TO FRIED. KRUPP AKTIENGESELLSCHAFT, OF ESSEN-ON-THE-RUHR, GERMANY.

MANUFACTURING KETTLE-SHAPED HOLLOW BODIES.

Application filed December 4, 1925, Serial No. 73,241, and in Germany December 5, 1924.

The invention relates to a process for manufacturing kettle-shaped hollow bodies from plane sheet-metal plates by pressing and has for its object to manufacture in this way hollow bodies of a comparatively great thickness of the wall, great diameter and great length.

Hitherto only comparatively thin-walled kettle-shaped hollow bodies could be manufactured from plane sheet-metal plates, this manufacture having been carried out by means of the so-called drawing process, in which first the plate is flanged at its edge by pressing it in cold state through a drawing ring of comparatively great gage diameter and the work is then pressed through a series of drawing rings of successively decreasing gage. The stamps employed are of a diameter nearly equal to the gage diameter of the appurtenant drawing ring reduced by double the wall-thickness of the sheet-metal plate. This process, however, can be employed only up to a determined upper limit of the thickness of the sheet-metal. For, when this limit of the thickness of the sheet-metal is exceeded, the bottom of the work will always tear away even in case the sheet-metal is heated in order to increase its ductility. Therefore it has been hitherto deemed to be impossible to manufacture thick-walled kettle-shaped hollow bodies, in particular those of great length and great diameter, by pressing them from plane sheet-metal plates.

Now the invention is based upon the perception that this problem can be realized by using for the drawing of the heated work through the draw rings a stamp, the diameter of which is by a sufficient amount smaller than the gage diameter of the draw ring diminished by double the thickness of the sheet-metal.

Figure 2:
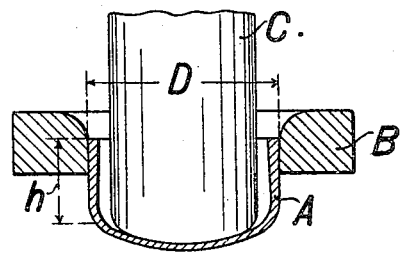
Figure 3:
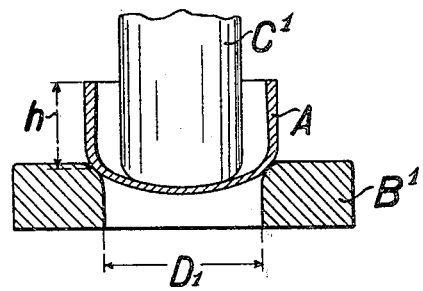
Figure 4:
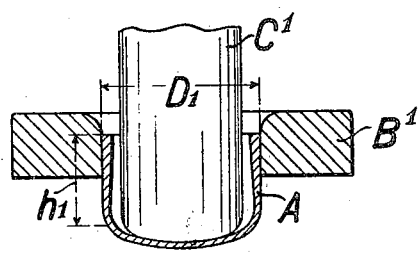

On the drawing a method of carrying out the process is illustrated, the Figures 1 to 4 showing each a section through the drawing elements with the work, in different mutual positions of the draw ring and stamp.

In these figures A denotes the work, B and $B^1$, respectively, the draw ring, and C and $C^1$, respectively, the stamp. The heated plane sheet-metal plate is first brought into the shape of a spherical cap (Fig. 1), which is then pressed through the draw ring B by the stamp C in the manner shown in Figs. 1 and 2, so that a hollow body is produced the bent portion of which has the height $h$. The outer diameter of the work is now equal to the gage diameter D of the draw ring. The work is then pressed through a second draw ring $B^1$ which is somewhat narrower, see Figs. 3 and 4, this being done by means of a stamp $C^1$ the diameter of which is less than that of the previously employed stamp. By this operation the height $h$ of the shell portion of the work is increased up to the amount $h_1$, Fig. 4, and at the same time the outer diameter of said shell portion decreases to the amount $D_1$ which is equal to the gage diameter of the second draw ring $B^1$. The diameter of the stamp used in each of the two press operations described is chosen so as to be by a sufficient amount smaller than the diameter $D$ or $D_1$ of the respective draw ring diminished by double the thickness of the wall of the sheet-metal, so that a relatively large clearance exists between the inner shell surface of the work A and of the stamp. Consequently the resistance offered by the work A when pressed through the draw rings, will be comparatively small. The force the work A is exposed to in its dangerous section situated near its bottom, by the pushing force of the stamp, will be correspondingly small so that the danger of the bottom being torn away, is obviated with security in particular in case the work is cooled in the proximity of its dangerous section in order to increase its conditions of strength. This effect is especially ensured also by the fact that the position of the dangerous section of the work is progressively altered during the pressing operation, as stamps are used in succeeding pressing strokes having diameters of decreasing size.

The work is thereupon pressed through the other draw rings of successively decreasing gage diameter in an analogous manner, that means with a sufficient clearance between its inner shell surface and the stamp, until said shell portion has finally obtained the desired length which may be a multiple of the diameter. In this way it is possible to manufacture with full security thick-walled hollow bodies by pressing from plane sheet-metal plates, that is bodies the bottom of which would tear away in its dangerous section when a stamp of the diameter hitherto employed would be used. As long as the shell portion has a comparatively small height, which corresponds about to the height of the shell portion of the head of a boiler, the process hitherto known may be employed, in which the diameter of the stamp is nearly equal to the gage diameter of the draw ring diminished by double the thickness of the sheet-metal.

With the hollow bodies produced by the described process the shell portion has a wall thickness which considerably increases towards the free end, due to the jumping up the work undergoes. This feature may be made use of to manufacture kettle bodies of great length, by pressing now in a well-known manner the hollow bodies through a series of suitably shaped draw rings by means of stamps tightly fitting therein. By this operation the shell portion becomes of uniform wall thickness. As in this operation it is the matter about very little alterations of the outer diameter, the resistance offered to the work by the draw rings is so small that the bottom will not tear. For instance, from a sheet-metal plate of a diameter of about 3 m. and of a thickness of 50 mm. a seamless kettle-shaped body closed at one end and of about 800 mm. in diameter, 30 mm. wall-thickness and of a length of more than 4 m. has been manufactured with the described process. Of course, bodies of greater diameter and greater lengths can be manufactured by correspondingly shaping the original sheet-metal plate.

Claim:

The process of manufacturing kettle shaped bodies from a blank of thick sheet metal, which consists in forcing said blank through a series of open dies of diminishing diameters by means of plungers, each plunger having a diameter substantially less than the least clear gage of the die with which it is used diminished by twice the wall thickness at the free end of the blank resulting from the pressing operation, the blank engaging ends of the plungers used in successive pressing operations being of different diameters, whereby the position of the dangerous section of the blank is progressively altered.

The foregoing specification signed at Cologne, Germany, this 17th day of November, 1925.

KARL BÖHLE.